(No Model.)

L. P. HALLADAY.
SAW SHARPENING MACHINE.

No. 418,790. Patented Jan. 7, 1890.

Witnesses:
H. B. Hallock.
Celeste P. Chapman.

Inventor
L. P. Halladay.
By Francis M. Parker
Attorney

UNITED STATES PATENT OFFICE.

LEWIS P. HALLADAY, OF CHICAGO, ILLINOIS.

SAW-SHARPENING MACHINE.

SPECIFICATION forming part of Letters Patent No. 418,790, dated January 7, 1890.

Application filed February 7, 1889. Serial No. 299,004. (No model.)

*To all whom it may concern:*

Be it known that I, LEWIS P. HALLADAY, a citizen of the United States, and a resident of Chicago, in the county of Cook and State of Illinois, have invented a certain new and useful Improvement in Saw-Sharpening Machines, of which the following is a specification.

My invention relates to improvements in saw-sharpening machines, and has for its object to provide a machine in which the teeth will be properly ground. I accomplish this by means of the devices illustrated in the accompanying drawings, wherein—

Figure 1:
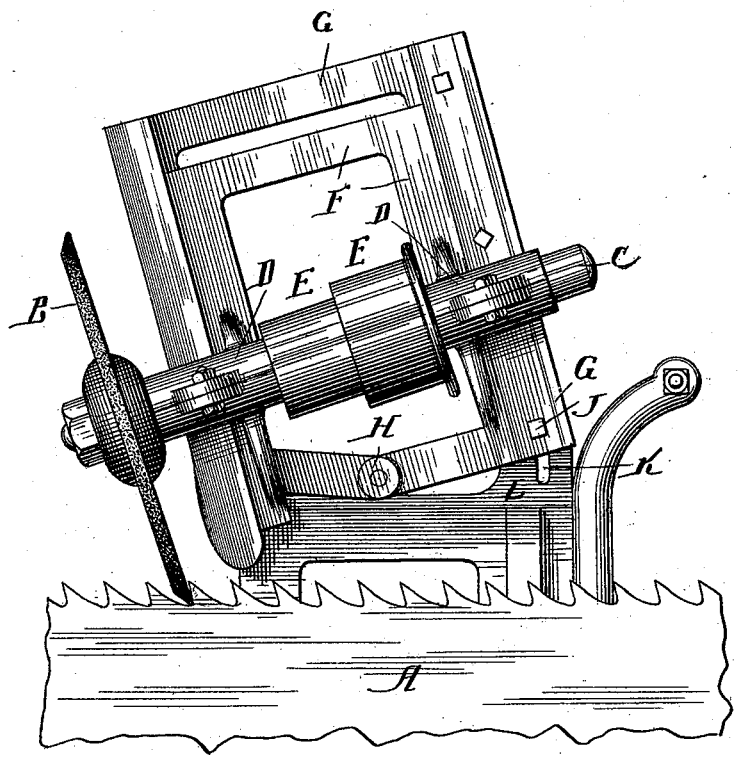
Figure 2:
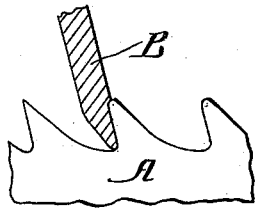

Figure 1 is a front elevation of the arbor-head, arbor, and saw in position; and Fig. 2 is a detail showing the relation of tooth and grinding wheel in the old form of the machine.

Like parts are indicated by the same letter in both figures.

A is the saw suitably held; B, the grinding-wheel on the arbor C. This arbor is journaled in the bearings D D and carries the pulleys E E, by which it is driven. The wheel and arbor are supported on the sliding frame F, which is itself supported on the tilting frame G. This latter frame is pivoted at H and adjustably supported by the bolt J, which passes through the slot K on the main frame L. The arbor is set diagonally to the line of the motion of its sliding frame.

The use and operation of my invention are as follows: In grinding saws wherein the side surface of the grinding-wheel is parallel with the plane of its motion it is apparent that in time there will be cut away a certain amount of the grinding-surface of such wheel about its edge to the average depth of the teeth ground, as indicated in Fig. 2. As this process continues, the grinding-wheel is gradually unfitted for use, and the teeth of the saw are gradually conformed to the very undesirable shape shown in the left of Fig. 2. By setting the grinding-wheel at an angle other than a right angle to the line of its motion it is easily seen, as indicated in Fig. 1, that the edge of the wheel is presented to and passes down along the face of the teeth, and that neither tooth nor wheel is injured. As the work of the beveled portion of the edge of the wheel is greater than that of the edge proper, the wheel will continue to retain a sharp edge and a bevel, substantially as shown, for an indefinite period. The inclination of the wheel to the line of its motion can be greatly varied.

The foregoing description must be read with reference to the idea that an important circumstance in the operation of the saw-sharpener is that the edge of the grinding-wheel strikes first the point of the tooth and then descends along the face of such tooth at an angle thereto, so that the point of the tooth is never in contact with the side of the wheel, but only with the edge thereof.

I consider the axis of the saw its diameter in the case of a circular saw, or a line across it at right angles to its length in the case of a band-saw. The fact of the angular relation of the grinding-wheel to its frame is important when that angle is acute toward the saw, for in that event the wheel is able to give the under-cut or hook to the saw, which it cannot give when the saw is set in any other relation.

I claim as new and desire to secure by Letters Patent—

1. In a saw-sharpening machine, a grinding-wheel set at an angle to the line of its reciprocating motion, said angle acute toward the saw to be ground.

2. In a saw-sharpening machine, a grinding-wheel, in combination with a reciprocating frame on which it is supported, said grinding-wheel set at an angle to the line of the motion of said frame, said angle acute toward the saw to be ground.

3. In a saw-sharpening machine, a grinding-wheel, in combination with a reciprocating frame and an arbor on which such grinding-wheel is fixed and which is itself set diagonally on such reciprocating frame, the grinding-wheel at an angle to the reciprocating frame, said angle acute toward the saw to be ground.

4. In a saw-sharpening machine, a grinding-wheel, in combination with a reciprocating frame which moves at an angle to the axis of the saw, and an arbor which carries the grinding-wheel and which is set at an angle to the axis of the saw and is supported on the moving frame.

5. In a saw-sharpening machine, a grinding-wheel, in combination with a frame which is adapted to reciprocate at an angle to the axis of the saw, and an arbor supported diagonally on such frame and carrying the grinding-wheel, the latter set at an angle to the frame, said angle acute toward the saw to be ground.

Dated this 5th day of February, 1889.

LEWIS P. HALLADAY.

Witnesses:
 FRANCIS W. PARKER,
 CELESTE P. CHAPMAN.